United States Patent
Winter et al.

(10) Patent No.: US 7,578,953 B2
(45) Date of Patent: Aug. 25, 2009

(54) METHOD OF SULFONATING AN ARTICLE AND RELATED APPARATUS

(75) Inventors: Charles H. Winter, Bloomfield Hills, MI (US); Dwayne Back, Royal Oak, MI (US); Elena Sebe, West Bloomfield, MI (US)

(73) Assignee: Sulfo Technologies, LLC, Madison Heights, MI (US)

( * ) Notice: Subject to any disclaimer, the term of this patent is extended or adjusted under 35 U.S.C. 154(b) by 80 days.

(21) Appl. No.: 11/672,332

(22) Filed: Feb. 7, 2007

(65) Prior Publication Data

US 2007/0185221 A1    Aug. 9, 2007

Related U.S. Application Data

(60) Provisional application No. 60/765,934, filed on Feb. 7, 2006.

(51) Int. Cl.
*B27N 3/08* (2006.01)
*B05D 7/22* (2006.01)
*B05D 3/12* (2006.01)
*C23C 16/00* (2006.01)

(52) U.S. Cl. ............. 264/83; 427/237; 427/248.1; 427/400; 427/343; 427/322

(58) Field of Classification Search ............ 264/83; 427/237, 248.1, 400, 343, 322
See application file for complete search history.

(56) References Cited

U.S. PATENT DOCUMENTS

| | | | | |
|---|---|---|---|---|
| 5,030,399 A | * | 7/1991 | Walles et al. | 264/83 |
| 5,156,783 A | * | 10/1992 | Seizert et al. | 264/83 |
| 5,512,665 A | * | 4/1996 | Uchiyama et al. | 536/4.1 |
| 6,758,910 B2 | * | 7/2004 | Schmoyer | 118/715 |

* cited by examiner

*Primary Examiner*—Peter G O'Sullivan
(74) *Attorney, Agent, or Firm*—Bill C. Panagos; Rader, Fishman & Grauer, PLLC

(57) ABSTRACT

An article is sulfonated by forming a sulfonating gas composition containing a gaseous sulfur-containing compound provided from a gas source. The gas source may utilize a chemical feed stock that includes a precursor sulfur-containing compound. The article is then contacted with the sulfur-containing gas until a surface treatment is effected. Next, the article is then optionally contacted with a gaseous neutralization composition, and then a liquid neutralization composition. In another sulfonation method, a first test sample is sulfonated and then analyzed by inductively coupled plasma analysis and X-ray fluorescence spectroscopy. A calibration relationship between the two spectroscopic techniques is determined with the inductively coupled plasma atomic spectroscopic value taken as the accurate value. In subsequent sulfonation runs, test samples are included and monitored by X-ray fluorescence.

3 Claims, 1 Drawing Sheet

METHOD OF SULFONATING AN ARTICLE AND RELATED APPARATUS

CROSS-REFERENCE TO RELATED APPLICATIONS

This application claims the benefit of U.S. Provisional Application Ser. No. 60/765,934 filed Feb. 7, 2006.

BACKGROUND OF THE INVENTION

1. Field of the Invention

This invention relates generally to forming a sulfonated layer on an article, and more particularly to an apparatus and method for sulfonating an article and the articles made thereby.

2. Background Art

Exposure of the surfaces of plastic components to sulfur-containing compounds is known to enhance certain properties of these surfaces. This exposure is usually referred to as sulfonation. In one example, sulfonation of a plastic surface is known to form a barrier layer with decreased permeation to hydrocarbons and organic solvents. Such barrier layer formations are particularly useful in plastic gasoline tanks, filler necks, gasoline caps, and rollover valves.

In one such prior art sulfonation method, a sulfur-containing gas is contacted with the inner surface of a gasoline tank, thereby creating a sulfonation barrier layer to prevent permeation of gasoline. In this prior art process, the gasoline tanks are made of a sulfonatable polymer, i.e., one which has hydrogen atoms bonded to the carbon atoms replaceable by sulfonic acid groups. Examples of sulfonatable polymers include polypropylene, polyethylene, polybutylene, etc. Non-reactive polymers such as polytetrafluoroethylene are not sulfonatable.

The prior art sulfonation methods include processes in which sulfonatable polymers are treated with sulfur trioxide gas. In the prior art methods, the entire gasoline vessel and/or its complementary components are placed into a reaction chamber which is subsequently evacuated. Sulfur trioxide gas is then introduced into the chamber thereby contacting and sulfonating the articles within the chamber. Although this prior art method produces sulfonated articles with acceptable properties, the method tends to be slow, requiring the storage of unacceptably large volumes of sulfur trioxide.

U.S. Pat. No. 6,758,910 (the '910 patent) solves a number of problems of the prior art. For example, the '910 patent provides an apparatus for rapidly, inexpensively and efficiently sulfonating the surface of an article with a sulfonating gas. The methodology of the '910 patent allows for the formation of treated surfaces that are impermeable to hydrocarbons and organic solvents. However, the methods of the '910 patent tend to produce articles with a lingering acid content that lead to failure and degradation of final products that incorporate the sulfonated articles. Moreover, the sulfur monitoring methods disclosed in the '910 patent have not been found to be useful in that such monitoring is expensive and cumbersome to implement. These sulfur monitoring methods attempt to monitor the amount of sulfur in the reagents and not in the sulfonated articles. Accordingly, these methods are also somewhat unreliable.

Accordingly, there exists a need for improved methods of sulfonating plastic articles with reduced lingering acidity, and for a sulfonation process in which the amount of sulfonation in sulfonated articles is accurately measured.

SUMMARY OF THE INVENTION

The present invention solves one or more problems of the prior art by providing a method of sulfonating a resin-containing article with a sulfonating gas. The method of the invention represents an improvement of methodology of U.S. Pat. No. 6,758,910, the entire disclosure of which is hereby incorporated by reference. The present invention enhances the methods of U.S. Pat. No. 6,758,910 by recognizing that a liquid neutralization treatment of sulfonated article(s) at elevated temperature is required post-sulfonation. In other embodiments of the invention, methodology for accurately determining the amount of sulfonation in an article is provided.

In one embodiment, a method of sulfonating a resin-containing article is provided. The method of this embodiment comprises forming a sulfonating gas composition which comprises a sulfur-containing gaseous compound provided by a gas source. The resin-containing article is then contacted with the sulfur-containing gas until a surface treatment is effected. Next, the sulfonated article is contacted in sequence with a gaseous neutralization composition and then a liquid neutralization composition. The method of this embodiment is useful for sulfonating articles that are placed within an enclosed reactor chamber as well as articles which contain hollow cavities.

In another embodiment of the present invention, a method for determining the amount of sulfonation of an article is provided. In this embodiment, the amount of sulfur in a test sample is determined after sulfonation. The method of this embodiment comprises forming a first sulfonating gas composition that includes a sulfur-containing gaseous compound provided from a gas source. One or more first test samples are contacted with the first sulfonating gas composition. The one or more first test samples are then contacted with at least one neutralization composition. Next, the amount of sulfur in the one or more first samples is determined by inductively coupled plasma analysis and by X-ray fluorescence. In a variation, the inductively coupled plasma analysis utilizes inductively coupled plasma atomic emission spectroscopy. A calibration relationship between the amount of sulfur determined by inductively coupled plasma analysis and the amount determined by X-ray fluorescence is determined with the amount of sulfur determined by inductively coupled plasma analysis taken as an accurate value. In a subsequent run, a second sulfonating composition is formed. Similarly, the second sulfonating composition comprises a sulfur-containing gaseous compound provided from a gas source. The article and one or more second test samples are then contacted with the second sulfonating gas composition. The article and the one or more second test samples are then contacted with at least one neutralization composition. The amount of sulfur in the second test sample is then measured by X-ray fluorescence using the previously determined calibration relationship. In a subsequent sulfonation run, either the concentration of sulfur-containing gaseous compound in the sulfonating gas composition or the time of sulfonation is adjusted to obtain a predetermined level of sulfur in subsequently sulfonated article(s).

DETAILED DESCRIPTION OF THE INVENTION

Figure 1:
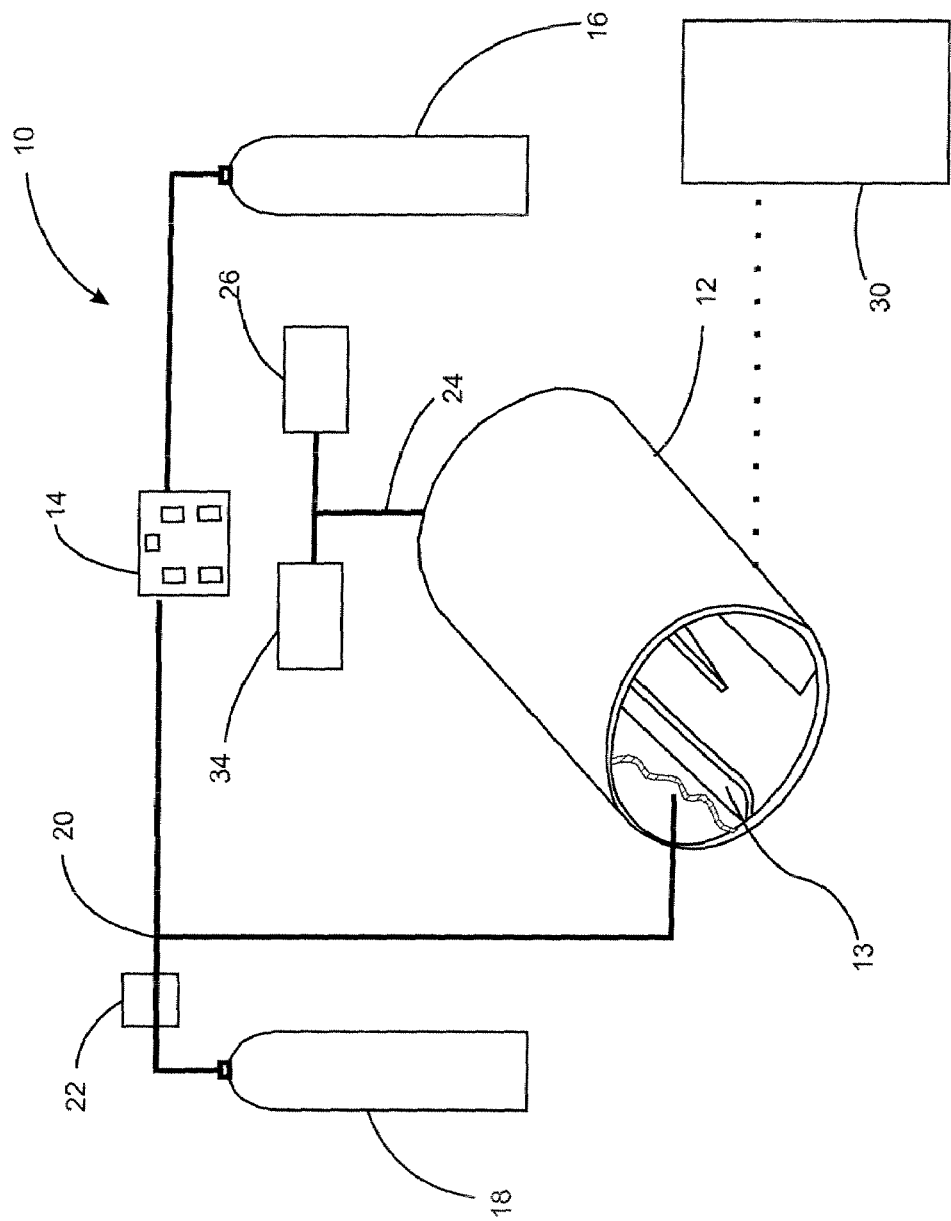
FIG. 1 is a schematic of a sulfonating system implementing the embodiment of the method of the invention.

Reference will now be made in detail to presently preferred compositions or embodiments and methods of the invention, which constitute the best modes of practicing the invention presently known to the inventors.

"Inductively Coupled Plasma—Atomic Emission Spectrometry (ICP-AES)" refers to an inductively coupled plasma analysis technique for determining the concentrations of an element in a sample. In this technique, an inductively coupled plasma is used to produce excited atoms that emit radiation at a wavelength characteristic of a particular element with the intensity of the emitted radiation being indicative of the concentration of the element within the sample. A detailed description of ICP-AEP is found in *ICP Emission Spectrometry: A Practical Guide*, by Joachim Nölte, 2003, Wiley-VCH Verlag GmbH & Co. KGaA, Weinheim, the entire disclosure of which is hereby incorporated by reference.

With reference to FIG. 1, a schematic of an apparatus implementing the methods of the invention is provided. Sulfonation apparatus 10 includes reaction chamber 12 into which resin-containing article(s) are to be sulfonated. Reaction chamber 12 includes agitating fins 13 to assist in effective mixing. A sulfonating gas composition is introduced into reaction chamber 12. The sulfonating gas composition includes a sulfur-containing gaseous compound that is from sulfur-containing gas source 14. As used herein, the term "gas source" includes gas generators that form sulfur-containing gas or storage tanks that contain sulfur-containing gas. In one variation, sulfur containing gas source 14 acts upon chemical feedstock provided from chemical feedstock source 16 to form a sulfur-containing gaseous compound. The sulfur-containing gaseous compound is combined with a diluent supplied from diluent source 18 at position 20 to form the sulfonating gas composition used to treat articles. Optionally, such diluents are heated via inline heaters 22. An example of a suitable diluent is dry air. In a variation, the sulfur-containing compound is present in an amount from about 1% to about 50% by volume of the total volume of the sulfonating gas composition. In another variation, the sulfur-containing compound is present in an amount from about 1% to about 20% by volume of the total volume of the sulfonating gas composition. In yet another variation, the sulfur-containing compound is present in an amount from about 3% to 12% volume percent of the total volume of the sulfonating gas composition. In still another variation, the sulfur-containing composition is present in an amount of about 9% by volume of the total volume of the sulfonating gas composition. The article(s) to be sulfonated are then contacted with the sulfonating gas composition. The surface of the article(s) has an acid residue concentration formed thereon from the sulfonation. The term "acid residue concentration" refers to the concentration of acid functional groups attached to the surface of the article(s). The residue acid concentration is characterized by a surface pH which measures the pH change of a water test sample contacting the surface. The measurement of the surface pH is performed analogously to the procedure described in ASTM D 4262-05, the entire disclosure of which is hereby incorporated by reference. Specifically, surface pH is obtained by first dipping a pH strip in water. The pH strip is then held to the surface of a part for about 10 seconds. The pH reading is then recorded as the surface pH. The spent sulfonating gas composition is transferred (e.g., exhausted) through exhaust 24 and treated by exhaust treatment system 26. Suitable exhaust treatment systems include systems for reducing acidic components as known to those skilled in the art of exhaust treatment. Examples of such systems include scrubbers in which water is efficiently mixed and contacted with the exhausted sulfonating gas composition. The water used in such scrubbers is then optionally neutralized with a base.

In a variation of the present embodiment, exhaust system 26 includes a gas delivery and removal system for recycling and reusing the sulfonating gas that is exhausted after the sulfonation treatment. In this variation, exhaust system 26 is interconnected with gas source 14 so that the exhausting sulfonating gas can be returned to the gas source to rejuvenate the level of sulfur-containing gas to an optimum sulfonating level for the next job.

After the article(s) are exposed to the sulfonating gas composition for a sufficient time, the flow of sulfonating gas composition is ceased with reaction chamber 12 optionally evacuated. The amounts of sulfur and/or the required time for sulfonation are advantageously determined by the process enhancements set forth below. A gaseous neutralization composition is then optionally introduced into reaction chamber 12. This neutralization step is used so that reaction chamber 12 can be opened with minimal release of the sulfur-containing gas into the environment and the work place. Gaseous ammonia is particularly useful in this step. When gaseous ammonia is used, water is optionally added to the gaseous ammonia. In one variation, the concentration of ammonia in the gaseous composition is from about 50% by volume to 100% by volume of the total volume of the gaseous neutralization composition. Spent gaseous neutralization composition is also exhausted through exhaust 24. However, this time the exhaust gases are directed to treatment system 34. After neutralization with the gaseous neutralization composition, the article(s) are then removed from reaction chamber 12 and transferred to neutralization station 30. Within neutralization chamber 30, the sulfonated article(s) are contacted with a liquid neutralization composition to neutralize any acidic groups or components within or on the surfaces of the sulfonated article(s). Such lingering acidity has been known to cause degradation of finished products that incorporate the sulfonated article(s) in certain applications. The sulfonated article is contacted with the liquid neutralization composition at a sufficient temperature to adjust the acid residue concentration such that the article has a surface pH equal to or greater than 3. In another refinement of the present invention, the sulfonated article is contacted with the liquid neutralization composition at a sufficient temperature to adjust the acid residue concentration such that the article has a surface pH between 5 and 8. In yet another refinement of the present invention, the sulfonated article is contacted with the liquid neutralization composition at a sufficient temperature to adjust the acid residue concentration such that the article has a surface pH between 5.5 and 7.5. In still another refinement of the present invention, the sulfonated article is contacted with the liquid neutralization composition at a sufficient temperature to adjust the acid residue concentration such that the article has a surface pH between 5.5 and 6.5. Useful temperature for these refinements are typically greater than 35° C. In one refinement of the present embodiment, the liquid neutralization composition is contacted with the article at a temperature from about 40° C. to about 90° C. In another refinement of the present embodiment, the liquid neutralization composition is contacted with the article at a temperature from about 45° C. to about 70° C. In still another refinement of the present embodiment, the liquid neutralization composition is contacted with the article at a temperature from about 50° C. to about 60° C. The liquid neutralization typically comprises water and a base. Suitable bases include, for example, aqueous ammonia, sodium hydroxide, potassium hydroxide, calcium carbonate, sodium bicarbonate, and combinations thereof. In a variation, the liquid neutralization composition comprises caustic soda. In another variation, the liquid composition comprises a component section from the group consisting of ammonia, calcium, aluminum and any positively charged ion-containing fluid and solutions and mixtures thereof. In yet another variation, the sulfonated articles are treated at room temperature with the liquid neutralization. In still another variation, the sulfonated articles are treated with the liquid neutralization composition at a temperature from about 30° C. to about 100° C. The dual neutralization methodology of the present invention advantageously reduces post-sulfonation degradation of finished particles incorporating the sulfonated articles by reducing the lingering acidity. In an example, one or more articles after sulfonation are contacted with an aqueous solution having pH greater than or equal to 12 at a temperature of about 55° C. and agitated for about 30 minutes. Next the articles are transferred to a water bath at a temperature of about 40° C. and agitated for about 5 minutes. The articles are then subjected to three water rinses accomplished by immersion.

In a variation of this embodiment, resin-containing articles with hollow cavities are sulfonated as such by the methods described by U.S. Pat. No. 6,758,910 which is incorporated by reference. In the present variation, after sulfonation the gaseous neutralization composition is introduced into the hollow cavities and then evacuated. Finally, the liquid neutralization composition is added to the hollow cavities and then removed.

The gas source of the present invention is typically an on-site gas generator. The term "on-site gas generator" as used herein means that the gas generator is located at the same location as where the sulfonation is performed such that the sulfur-containing gas is used on demand as it is generated. Any suitable generator that generates a sulfur-containing gas is utilized. Examples include, but are not limited to, sulfur trioxide generators that use a chemical feed stock selected from the group consisting of raw or liquid sulfur, processed sulfur, sulfur dioxide, liquid sulfur dioxide, sulfur trioxide, sulfuric acid and mixtures thereof.

Virtually any generator that generates a sulfur-containing compound capable of sulfonating an article may be used in the practice of the invention. In one variation, the gas generator system is a sulfur trioxide generator which utilizes molten sulfur transferred from a storage tank into a refractory-lined vessel. In another variation, the sulfur burns in the ambient air conditions to form a gaseous sulfur dioxide/air mixture. This mixture may then flow into a multi-stage catalytic converter where conversion of the sulfur dioxide to sulfur trioxide is extremely efficient. The catalytic converter is preferably made of vanadium oxide, although other suitable catalytic materials are contemplated by the present invention. A particularly useful on-site generator is produced and sold by Chemithon Corporation of Seattle, Wash., as a flue gas conditioning system. Chemithon makes a number of different gas generator systems, each utilizing a different chemical feedstock. Such a system is also contemplated including a liquid sulfur dioxide system which may be utilized where liquid sulfur dioxide is vaporized in a heated tank and mixed with heated air to form a gaseous sulfur dioxide/air mixture. Like the sulfur burning system described above, this mixture also flows into a multi-stage catalytic converter where the sulfur dioxide catalytically oxidizes to sulfur trioxide. In yet another variation suitable for smaller applications, the gas generator is of a design that utilizes a sulfuric acid system in which a sulfuric acid-containing composition is transferred into a vaporizer and mixed with heated air to form the sulfur-containing gas. In one variation, the sulfuric acid-containing composition comprises a liquid. In another variation, the sulfuric acid-containing composition comprises fuming sulfuric acid.

Typically, the sulfonating process forms a barrier layer onto, or incorporated into, a polymeric article which is made of a sulfonatable material. Examples of such sulfonatable materials include, plastics made of a relatively high molecular weight thermoplastic resin. In such materials a permeation layer is formed which substantially prevents hydrocarbon solvents from passing therethrough. Moreover, the sulfonation provides impermeability to various oleophilic materials such as gasoline and other solvents. In addition to the barrier improvements, sulfonating also provides other properties, including antistatic properties, and greater adhesion of paints and other types of coatings. Therefore, such surface sulfonated polymeric materials may also be used as substrates for painting and coating. Some other uses contemplated by the present invention include sulfonating containers such as articles like food containers including plastic bottles, cartons, tubs and the like, and plastic substrates to be used in a number of industrial applications which need to be painted and/or coated thereafter. Consequently, the number of uses for a sulfonated surface are many fold, and are not just restricted to creating a barrier layer on a gasoline tank. However, most of our discussion will be restricted to that usage, with the proviso that such sulfonated articles may be useful in many other applications.

Although the advantages of the methods of the present invention are not related to any particular theory, it is hypothesized that during sulfonation, hydrogen atoms and derivatives thereof which are bonded to carbon atoms in the hydrocarbons are replaced by sulfonic acid groups, where they become bonded and form a barrier layer. The bonds of the new barrier layer material are more polar, and therefore, are less likely to allow permeation of hydrocarbons. In one variation, this advantage is realized by using polymeric materials which are sulfonatable by the methods of the invention. Suitable polymeric materials include, but are not limited to, polyolefin resins such as polyethylene (e.g., HDPE), thermoset plastics, including polyurethanes, epoxy resins, phenol formaldehyde resins, urea-formaldehyde resins, homopolymers and co-polymers, and blends thereof. In addition, thermoplastic condensation-type polymers such as nylon, polyamides and polyesters, may also be sulfonatable.

For example, in a variation of the present invention, a gaseous phase reactant mixture containing from about 1% to about 20% by volume of sulfur trioxide, and balance dry air will require from approximately 8 minutes to about 15 minutes to sulfonate a polyethylene article in a reactor chamber to a degree of from about 0.1 to about 5,000 micrograms $SO_3/in^2$, at room temperature (25° C.). If an optional in-line heater is used to heat the dry air, the higher temperature will cause a reduced treatment time to achieve the same degree of sulfonation. It is advantageous to employ a reaction temperature in the range from about 15° C. to about 70° C., and preferably from about 15° C. to about 40° C. The reaction is most advantageously carried out at a pressure from about 0.1 to about 70 PSI. Typically, the reaction is carried out at about atmospheric pressure. After treatment with the sulfur trioxide, gaseous ammonia is added to the reactor chamber and then evacuated. The sulfonated article is then transferred to a neutralization chamber containing caustic soda at a temperature of about 30° C. to about 100° C.

In a variation of the invention, the water vapor partial pressure of the reactant gas mixture is minimized to improve the uniformity of the sulfonation. The removal of water from the air supply is accomplished by any conventional methodology for reducing water vapor content. Examples of such methodology includes the utilization of vapor tubes, drying agents and the like. The concentration of water in the dry air is less than about 0.01 volume percent. In a further refinement, the concentration of water in the dry air is less than about 0.001 volume percent.

As set forth above, the sulfonating gas composition includes a sulfur-containing compound and an optional diluent. Although dry air works as a diluent at room temperature, it is especially useful at an elevated temperature of between about 15° C. and 70° C. In a variation, the sulfur-containing gas composition includes a mole percentage of sulfur within the sulfur-containing gas composition from about 1 percent to about 20 percent. The sulfur which is utilized may be sourced from a chemical feedstock selected from the group consisting of raw sulfur, processed sulfur, sulfur dioxide, liquid sulfur dioxide, sulfuric acid, sulfur trioxide and mixtures thereof. Various gas generating procedures will use various precursors, depending upon the equipment utilized and the desired end result. It should be appreciated that some of the sulfur in the sulfur-containing gas is consumed during the treatment to form the sulfonation treatment layer on the surface of the polymeric article.

In another embodiment of the present invention, a method determining the amount of sulfonation of a resin-containing article is provided. In this embodiment, the amount of sulfur in a test sample is determined after sulfonation. The method of this embodiment comprises forming a first sulfonating gas composition which comprises a sulfur-containing gaseous compound provided from a gas source. One or more first test samples are contacted with the first sulfonating gas composition. The one or more first resins comprise a resin. Typically, the resin-containing article comprises the same resin as the one or more test samples. The one or more first test samples are then contacted with at least one neutralization composition. Suitable neutralization compositions include the gaseous neutralization compositions and liquid neutralization compositions set forth above. In a variation, the one or more first test samples are contacted with a gaseous neutralization composition, and then a liquid neutralization composition as described in the embodiments set forth above. Next, the amount of sulfur in the one or more first samples is determined by inductively coupled plasma analysis and by X-ray fluorescence. In a variation, the inductively coupled plasma analysis utilizes inductively coupled plasma-atomic emission spectroscopy ("ICP-AES"). In one variation, the amount of sulfur in the one or more first test samples is determined by performing both the ICP-AES and X-ray fluorescence measurements on the same test sample. In another variation, the ICP-AES and X-ray fluorescence measurements are performed on different test samples. A calibration relationship between the amount of sulfur determined by inductively coupled plasma analysis and the amount of sulfur determined by X-ray fluorescence is determined with the amount of sulfur determined by inductively coupled plasma analysis taken as an accurate value. In a subsequent run, a second sulfonating composition is formed. Similarly, the second sulfonating composition comprises a sulfur-containing gaseous compound formed by the gas source. The article and one or more second test samples are then contacted with the second sulfonating gas composition. Again, the one or more second test samples comprise a resin. Typically, the resin-containing article comprises the same resin as the one or more test samples. The one or more first test samples are then contacted with at least one neutralization composition. The article and the one or more second test samples are then contacted with at least one neutralization composition. Again, suitable neutralization compositions include the gaseous neutralization compositions and liquid neutralization compositions set forth above. In a variation, the article(s) and the one or more second test samples are contacted with a gaseous neutralization composition and then a liquid neutralization composition as described in the embodiments set forth above. The amount of sulfur in the one or more second test samples are then measured by X-ray fluorescence using the previously determined calibration relationship. In a subsequent sulfonation run, either the concentration of sulfur-containing compound in the sulfonating gas composition or the time of sulfonation is adjusted to obtain a predetermined level of sulfur in subsequently sulfonated article(s).

In still another embodiment of the invention, an article sulfonated by the method of the invention is provided. The articles of this embodiment are made from a resin which is susceptible to enhancement by contact with the sulfur containing gas, and in particular with $SO_3$. Articles that are advantageously sulfonated by the methods of the invention include any resin-containing component that is likely to come in contact with hydrocarbon gases or organic solvents. Examples include, gasoline tanks, tubing, valves, and solvent containers. In a plastic gasoline tank application, a barrier layer is created that is useful for reducing the permeation of liquid gasoline through a plastic gasoline tank and escaping into the atmosphere. Other articles which are of great advantage include solvent containers for environmentally hazardous hydrocarbons such as benzene, toluene, methylene chloride, and the like. In addition to reducing solvent permeation, the methods of the present invention also advantageously enhance adhesion of surfaces that are sulfonated. The above-described apparatuses and methods may be utilized for sulfonating any type of article, whether the end result is a formation of a barrier layer, an adhesion layer, a coating or surface treatment, or any other purpose. Articles contemplated by the present invention not only include automotive parts and storage containers, but consumer goods which require good adhesion properties for coatings, industrial applications including recycled materials that will have better adhesion properties after sulfonating for reconstituting the materials, and any other article for which its exterior or interior surface is advantageously sulfonated. It may be useful for an article to be sulfonated for any host of reasons beyond its use as a barrier layer, including (but not limited to) better coating adhesion, as a precursor for crosslinked materials applied thereafter, or any other known use.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of sulfonating the surface of a resin-containing article, the method comprising:
   a) forming a first sulfonating gas composition, the sulfonating gas composition comprising a sulfur-containing gaseous compound provided from a gas source;
   b) contacting one or more first test samples with the first sulfonating gas composition;
   c) contacting the one or more first test samples with at least one neutralization composition;
   d) determining the amount of sulfur in the one or more first test samples by inductively coupled plasma analysis;
   e) measuring the amount of sulfur in the one or more first test samples by X-ray fluorescence;

f) determining a calibration relationship between the amount of sulfur determined by inductively coupled plasma analysis and X-ray fluorescence wherein the amount of sulfur determined by inductively coupled plasma analysis is taken as an accurate value;
g) forming a second sulfonating gas composition, the second sulfonating gas composition comprising a sulfur-containing gaseous compound provided from a gas source;
h) contacting the article and one or more second test samples with the second sulfonating gas composition;
i) contacting the article and the one or more second test samples with at least one neutralization composition;
j) measuring the amount of sulfur in the first test sample by X-ray fluorescence using the calibration relationship determined in step f) to adjust the determined amount of sulfur; and
k) adjusting concentration of sulfur-containing compound in the sulfonating gas composition or adjusting the time of sulfonating in subsequent sulfonation runs if the amount of sulfur determined in step j) is not equal to a predetermined value, wherein the first and second test sample each individually comprise a resin.

2. The method of claim 1 wherein step c) comprises:
c1) contacting the one or more first test samples with a gaseous neutralization composition; and
c2) contacting the one or more first test samples with a liquid neutralization composition.

3. The method of claim 1 wherein step i) comprises:
i1) contacting the article and the one or more second test samples with a gaseous neutralization composition; and
i2) contacting the article and the one or more second test samples with a liquid neutralization composition.

* * * * *